P. H. BREED.
STARTING CRANK FOR AUTOMOBILES.
APPLICATION FILED MAR. 2, 1910.

1,098,878. Patented June 2, 1914.

Witnesses

Inventor
P. H. Breed,
By A. S. Pattison
Attorney

UNITED STATES PATENT OFFICE.

PRESTON H. BREED, OF PITTSFIELD, MASSACHUSETTS, ASSIGNOR, BY MESNE ASSIGNMENTS, TO ALDEN SAMPSON MANUFACTURING COMPANY, A CORPORATION OF NEW JERSEY.

STARTING-CRANK FOR AUTOMOBILES.

1,098,878.      Specification of Letters Patent.      Patented June 2, 1914.

Application filed March 2, 1910. Serial No. 546,909.

*To all whom it may concern:*

Be it known that I, PRESTON H. BREED, a citizen of the United States, residing at Pittsfield, in the county of Berkshire and State of Massachusetts, have invented certain new and useful Improvements in Starting-Cranks for Automobiles, of which the following is a specification, reference being had therein to the accompanying drawings.

My invention relates to improvements in starting cranks for automobiles.

The object of my invention is to provide a crank which can be entirely withdrawn from its connection with the engine crank shaft and swung around, so that any contact with the crank by collision or otherwise, will not couple the crank to the engine shaft or impart the blow to the shaft.

Another object of my invention is to provide a more simple, cheap and effective manner of accomplishing this result, and also providing proper means for holding the crank in its position out of engagement with the engine shaft.

Figure 1:
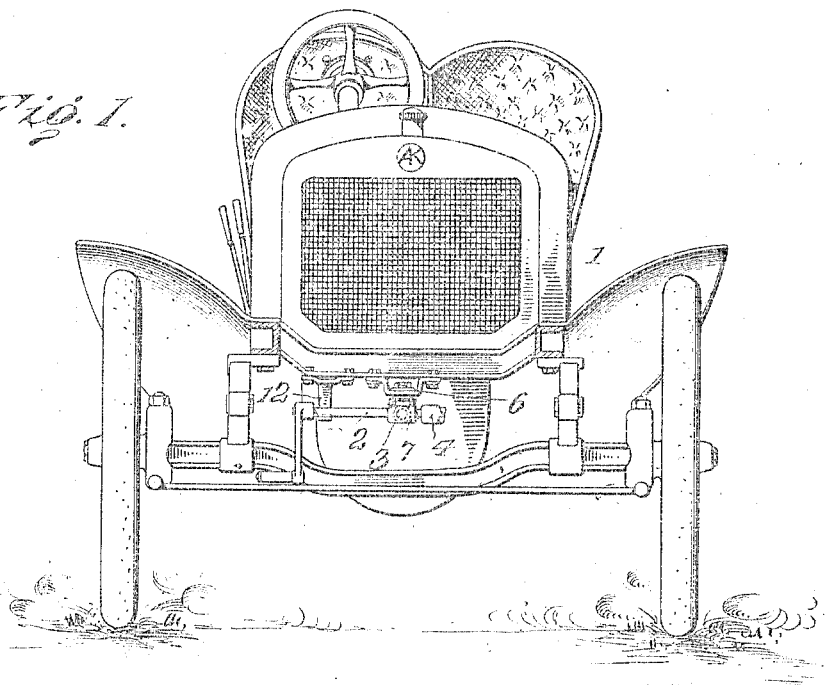
Figure 2:
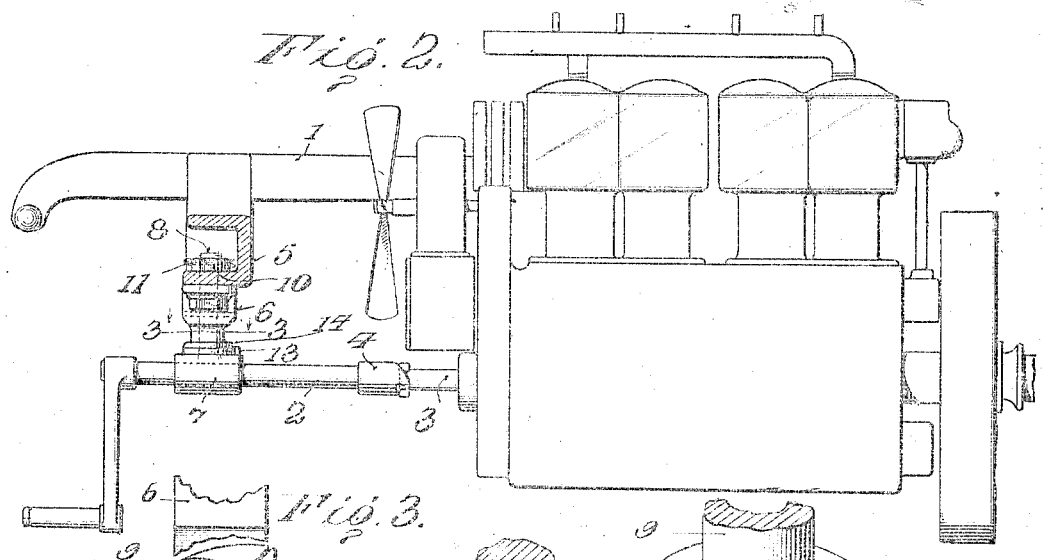
Figure 3:
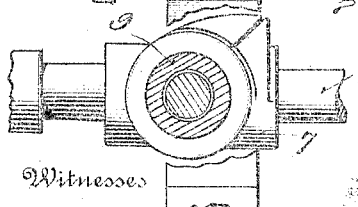
Figures 4, 5:
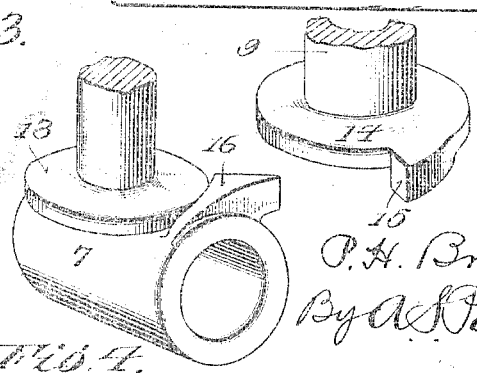

In the accompanying drawings—Figure 1 is a front view of an automobile showing the crank swung around out of engagement with the engine shaft. Fig. 2 is a longitudinal sectional view of Fig. 1, showing the crank connected to the engine shaft ready to crank the engine. Fig. 3 is a vertical sectional view taken on the line 3—3 Fig. 2. Fig. 4 is a perspective view of the crank bearing. Fig. 5 is a perspective view of the bushing in which the shaft bearing is mounted.

Referring now to the drawings, 1 represents an automobile which is of the usual type now in use having the crank 2 extending out beyond the front end of the vehicle. In automobiles of the type now used, the engine or crank-shaft 3 extends longitudinally of the vehicle and the crank is provided with means such as indicated at 4, for interlocking with the crank-shaft and whereby the crank-shaft is rotated for starting the engine. In this type of starting cranks the same is held outwardly by a spring for holding the same out of engagement with the crank-shaft and therefore as soon as the crank is released it is forced outwardly by the spring. In this type of cranks, as it will be understood, by those using the same the crank is at all times in an alinement with the crank-shaft and in case of a collision should the crank strike, it would be forced inwardly interlocking with the crank-shaft. The crank would doubtless be held against rotation and the engine running would doubtless break either the crank or cause some trouble with the engine, such as breaking the crank-case. Should the engine be standing still the blow of the crank against the engine shaft would, or might break the crank case or cause other damage to the engine. This might also be the case in the event that the engine was running and the crank did become locked against rotation.

In my device the cross-beam 5, of the automobile, is provided on its under face with a U-shaped bracket 6, which is preferably bolted to the beam 5. Below the bracket is the crank supporting bearing 7, which is preferably of an elongated form and in which is rotatably mounted the starting crank. The upper face of said bearing is provided with an upwardly extending lug or journal 8, which passes through the sleeve 9, carried by the bracket. The upper end of said journal above the bracket is screwthreaded, and upon which is screwed the nut 10, and said nut locked thereon by a cotter pin 11. By this construction it will be seen that the bearing 7 is free to oscillate. The crank 2, as shown, is longitudinally movable in the bearing so that it can be first removed from its connection with the engine crank-shaft, but can be drawn out so that it will oscillate freely. The beam 5 is provided with a hook 12 over which the crank 2 is sprung, and whereby the same is held in the position transverse of the car. By this arrangement I not only prevent any injury to the crank-shaft or engine, but the starting crank is folded out of the way and prevents injury thereto in case of a collision, as automobile starting cranks usually stick out beyond the frame of the automobile.

While I have shown and described the starting crank as being mounted in an oscillating bearing, it will be understood that I do not care to limit myself to this specific construction, as the result sought by applicant can be accomplished in many other ways.

The crank supporting bearing 7 is provided at its upper face with an enlarged disk portion 13, bearing upon the disk 14 carried by the lower end of the sleeve. In order that the starting crank can be centered so that it is opposite the engine shaft to couple the same together, I provide the disk 14 with a lug 15, so positioned that the lug 16 carried by the bearing 7 will engage the same when the crank shaft has been swung around to crank the engine, as is clearly shown in Fig. 3 of the drawing. It will be understood that other means for centering the crank could be employed without departing from my invention.

Having thus described my invention, what I claim and desire to secure by Letters Patent is:

1. The combination with the crank-shaft of a supported gas engine, of a movable support, a longitudinally movable starting crank carried by the support when in or out of alinement with the crank-shaft.

2. The combination with the crank-shaft of an automobile, of a movable support, a longitudinally movable starting crank carried by the support when in or out of alinement with the crank-shaft.

3. The combination with the crank-shaft of an automobile gas engine, of a longitudinally movable starting crank supported in an oscillating bearing carried by the automobile and means for locking the crank at right angles to the crank-shaft.

4. The combination with an automobile frame, an engine mounted thereon, a longitudinally movable starting crank movable in and out of engagement with the engine-shaft, and a movable bearing supporting the crank whereby the same can be moved out of alinement with the engine-shaft.

5. The combination with the crank-shaft of a gas engine, of a supported longitudinally movable starting crank adapted to be moved out of alinement with the crank shaft, and means for centering the crank shaft in alinement with the engine shaft.

6. The combination with the crank shaft of an automobile gas engine, of a longitudinally movable starting crank supported by the automobile and adapted to be moved in a direction transverse to the engine shaft, and means for stopping the crank shaft in alinement with the engine shaft.

7. The combination with the crank shaft of an automobile gas engine, of a longitudinally movable starting crank supported in an oscillating bearing carried by the automobile engaging stops carried by the bearing and automobile for stopping the crank in alinement with the engine shaft, and means for locking the crank at right angles to the engine shaft.

8. The combination with the crank-shaft of an automobile, of a support pivoted to the automobile, of a longitudinally movable starting crank carried by the support, and supported thereby when the crank is moved around out of alinement with the crank-shaft.

9. The combination with the crank-shaft of an automobile gas engine, of a movable support carried by the automobile, of a longitudinally movable starting crank carried by the support and supported thereby when the crank is moved around out of alinement with the crank shaft.

In testimony whereof I hereunto affix my signature in the presence of two witnesses.

PRESTON H. BREED.

Witnesses:
H. M. ADY,
C. J. TERRILL.